US012810624B2

(12) United States Patent
Choi

(10) Patent No.: US 12,810,624 B2
(45) Date of Patent: Nov. 24, 2026

(54) MULTI-ANGLE OBJECT RECOGNITION SYSTEM AND METHOD USING V2X TECHNOLOGY

(71) Applicant: HL Klemove Corp., Incheon (KR)

(72) Inventor: Jin-Kyu Choi, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 318 days.

(21) Appl. No.: 18/590,848

(22) Filed: Feb. 28, 2024

(65) Prior Publication Data

US 2025/0139985 A1 May 1, 2025

(30) Foreign Application Priority Data

Oct. 26, 2023 (KR) ........................ 10-2023-0144813

(51) Int. Cl.
*G06V 20/58* (2022.01)
*H04W 4/46* (2018.01)

(52) U.S. Cl.
CPC .............. *G06V 20/58* (2022.01); *H04W 4/46* (2018.02)

(58) Field of Classification Search
None
See application file for complete search history.

(56) References Cited

U.S. PATENT DOCUMENTS

2015/0200957 A1* 7/2015 Zhang .................... G08G 1/163 726/22
2020/0137580 A1* 4/2020 Yang .................... H04W 12/122
2020/0413264 A1* 12/2020 Han .................... H04W 12/122
2023/0152471 A1* 5/2023 Nekoui .................... G01S 19/396 342/357.64
2023/0286514 A1* 9/2023 Ucar .................... B60W 40/02
(Continued)

FOREIGN PATENT DOCUMENTS

CA 3113406 A1 * 3/2020 ............. G06V 20/20
CN 109686125 A * 4/2019 ............. G08G 1/161
CN 113808270 A * 12/2021 ............. G06T 17/05
(Continued)

OTHER PUBLICATIONS

Office Action issued on Nov. 26, 2025, for corresponding Korean Patent Application No. 10-2023-0144813, along with an English machine translation (17 pages).

*Primary Examiner* — Ricky Chin
(74) *Attorney, Agent, or Firm* — Hauptman Ham, LLP

(57) ABSTRACT

The present disclosure relates to a multi-angle object recognition system applied to a vehicle. The multi-angle object recognition system comprises: an information collection unit that collects information about a subject vehicle and surrounding information; a V2X communication unit that transmits and receives information collected by the information collection unit between vehicles; an information comparison unit that compares information collected by the subject vehicle with information received from another vehicle and when a false detection occurs, excludes the false detection from a control target; and a multi-angle view environment configuration unit that configures driving environment around the subject vehicle into a multi-angle view environment by combining only normal information among the information about the subject vehicle and the information received from the another vehicle.

20 Claims, 5 Drawing Sheets

(56) References Cited

U.S. PATENT DOCUMENTS

| | | | | | |
|---|---|---|---|---|---|
| 2023/0345249 | A1* | 10/2023 | Ansari | ................ | H04W 12/121 |
| 2025/0139985 | A1* | 5/2025 | Choi | ...................... | G06V 20/58 |

FOREIGN PATENT DOCUMENTS

| | | | | | |
|---|---|---|---|---|---|
| CN | 115064006 | A | * | 9/2022 | ............. G08G 1/166 |
| CN | 116552559 | A | * | 8/2023 | ........ B60W 60/0015 |
| CN | 116552560 | A | * | 8/2023 | .............. H04W 4/46 |
| CN | 116746187 | A | * | 9/2023 | ........ B60W 60/0015 |
| CN | 117858045 | A | * | 4/2024 | .............. H04W 4/06 |
| DE | 102020203701 | A1 | * | 9/2021 | ....... G08G 1/096791 |
| DE | 102021200827 | B3 | * | 6/2022 | ........ H04W 56/0015 |
| EP | 3448072 | B1 | * | 9/2020 | .............. H04W 4/40 |
| EP | 3907468 | A1 | * | 11/2021 | ............. G06F 16/29 |
| ID | P202305128 | A | * | 6/2023 | ........ B60W 60/0015 |
| JP | 2021-182177 | A | | 11/2021 | |
| JP | 2021-530394 | A | | 11/2021 | |
| KR | 10-1066081 | B1 | | 9/2011 | |
| KR | 10-2022-0143404 | A | | 10/2022 | |
| KR | 102459742 | B1 | * | 10/2022 | ............. H04L 43/50 |
| KR | 20230131844 | A | * | 9/2023 | .......... H04W 12/122 |
| KR | 20230133849 | A | * | 9/2023 | .......... H04W 12/088 |
| WO | WO-2022159173 | A1 | * | 7/2022 | .......... H04W 12/121 |
| WO | WO-2022198166 | A1 | * | 9/2022 | ............. G08G 1/161 |

* cited by examiner

MULTI-ANGLE OBJECT RECOGNITION SYSTEM AND METHOD USING V2X TECHNOLOGY

CROSS-REFERENCE TO RELATED APPLICATIONS

The present application claims the benefit of priority to Korean Patent Application No. 10-2023-0144813 filed on Oct. 26, 2023, in the Korean Intellectual Property Office. The aforementioned application is hereby incorporated by reference in its entirety.

TECHNICAL FIELD

The present disclosure relates to a multi-angle object recognition system and method applied to a vehicle, and more particularly, to a multi-angle object recognition system and method using V2X technology that configures a multi-angle view environment by sharing subject vehicle information and surrounding object recognition information with neighboring vehicles.

BACKGROUND

With the advent of the era of autonomous vehicles that can drive themselves without driver intervention, the domestic and international mobility industry is sparing no effort in research and investment to develop autonomous technology, and attention is focused on V2X, the core technology of autonomous vehicles.

The autonomous vehicle is equipped with an advanced driver assistance system (ADAS), a sensor-based recognition technology that can recognize the situations in front of and behind the vehicle and control the speed autonomously when there is a risk of collision.

The ADAS is a driver assistance system that allows the vehicle to detect and determine various situations that may occur while driving. The ADAS is equipped with state-of-the-art sensors such as cameras, Radar, and Lidar to warn of accident risks in advance during autonomous driving. However, these sensors have limitations in perception distance and range, and their accuracy may be reduced significantly depending on the surrounding environment (weather or road environment).

False detection of sensors during driving due to weather (light, rain, fallen leaves, snow, etc.), road environment (tunnels, steel structures, building structures, etc.), or mounting location of the sensors for each vehicle may lead to accidents such as a vehicle collision. In order to solve these problems, connected cars have recently been developed that reflect V2X communication technologies such as vehicle-to-vehicle and vehicle-to-infrastructure.

V2X refers to a communication technology that communicates with other vehicles and road infrastructure while driving to collect or share information about traffic conditions in unseen places. In V2X, X stands for everything and includes vehicles, infrastructure, pedestrians, and networks.

Despite the advantages of V2X technology, there are areas that need to be improved.

V2X technology is a communication technology, and processing speed may vary depending on the amount of data transmitted and received. For example, when a relatively large number of vehicles drive around a subject vehicle which is driving and exchange object recognition data with each other, the amount of data is bound to become enormous. In this case, the data processing speed may slow down, which is associated with vehicle control speed and may lead to a vehicle accident.

In addition, even for the same object, there may be differences in the degree of recognition of the object depending on the location of the vehicle, and in this case, it may not be possible to accurately determine whether the object is a normal object or an abnormal object.

SUMMARY

In view of the above, the present disclosure provides a multi-angle object recognition system and method using V2X technology that can configure a multi-angle view environment by sharing and combining subject vehicle information and surrounding object recognition information collected from the vehicle with neighboring vehicles.

A multi-angle object recognition system using V2X technology, in accordance with a preferred embodiment of the present disclosure, comprises: an information collection unit that collects information about a subject vehicle and surrounding information; a V2X communication unit that transmits and receives information collected by the information collection unit between vehicles; an information comparison unit that compares information collected by the subject vehicle with information received from another vehicle and when a false detection occurs, excludes the false detection from a control target; and a multi-angle view environment configuration unit that configures driving environment around the subject vehicle into a multi-angle view environment by combining only normal information among the information collected by the subject vehicle and the information received from the another vehicle.

The information collection unit includes: a subject vehicle information collection unit that collects information related to the subject vehicle; and a surrounding information collection unit that collects information about an object around the subject vehicle.

The information collected by the subject vehicle information collection unit includes at least one of a location of the subject vehicle, a distance to another vehicle, a speed of the subject vehicle, a driving direction of the subject vehicle, and a brake status of the subject vehicle.

The subject vehicle information collection unit and the surrounding information collection unit include sensors mounted to the vehicles.

The multi-angle object recognition system using V2X technology further comprises an information coding unit that codes the information collected by the subject vehicle and the information received from the another vehicle.

The information comparison unit compares the coded information collected by the subject vehicle with the coded information received from the another vehicle.

The information comparison unit includes: a duplicate information determination unit that determines whether the information collected by the subject vehicle matches the information received from the another vehicle; and a redundant information filtering unit that, when the information collected by the subject vehicle matches the information received from the another vehicle, deletes the redundant information received from the another vehicle.

The information comparison unit includes: a false detected object determination unit that, when there is a discrepancy between the information collected by the subject vehicle and the information received from the another vehicle, determines whether to include the discrepant information as the control target; and a false detected object filtering unit that, when the false detected object determination unit determines not to include corresponding object information as the control target, deletes the corresponding object information.

A multi-angle object recognition method using V2X technology, in accordance with a preferred embodiment of the present disclosure, comprises: collecting information about a subject vehicle and surrounding information; transmitting and receiving the collected information between vehicles through a V2X communication unit; comparing information collected by the subject vehicle with information received from another vehicle; excluding false detected object from a control target; and configuring a multi-angle view environment by combining normal information among the information collected by the subject vehicle and the information received from the another vehicle.

In the subject vehicle, the information collected by the subject vehicle and the information received from the another vehicle are coded and compared.

The coding is performed in a binary code method using 0 and 1

When it is determined that the information collected by the subject vehicle matches the information received from the another vehicle through the comparing of the coded information, the redundant information received from the another vehicle is deleted.

When it is determined that there is a discrepancy between the information collected by the subject vehicle and the information received from the another vehicle through the comparing of the information, whether to include discrepant corresponding object information as the control target is determined.

When it is determined that the corresponding object information is not the control target, the corresponding object information is removed.

The multi-angle view environment is configured by combining all normal object information collected by the subject vehicle and the another vehicle that is determined as the control target.

Based on reliability of information collected by the subject vehicle and the another vehicle for the corresponding object, information with a high level of reliability is first considered.

When there is an obstacle (vehicle or sign) between the corresponding object and a vehicle, the information collected by the corresponding vehicle is given a low level of reliability, and when there is no obstacle between the corresponding object and a vehicle, the information collected by the corresponding vehicle is given a high level of reliability.

When there is no obstacle between the corresponding object and a vehicle, the closer a distance between the corresponding object and the corresponding vehicle, the higher the reliability of the information collected by the corresponding vehicle.

The information collected by a vehicle without errors in detection means that recognize objects is given a high level of reliability.

After configuring the multi-angle view environment, the multi-angle view environment is updated by reflecting newly recognized normal object information.

According to the multi-angle object recognition system and method using V2X technology of the present disclosure, information related to the subject vehicle and surrounding object recognition information collected by neighboring vehicles are shared and combined between the neighboring vehicles using V2X communication to configure a multi-angle view environment, so that systems related to vehicle driving, such as an advanced driver assistance system which is a sensor-based recognition technology, can be operated stably.

In other words, even if a false detection of a sensor occurs due to weather, road environment, or sensor mounting location for each vehicle, it is possible to prevent accidents such as vehicle collisions due to the false detection by comprehensively considering information collected from other vehicles to determine whether to include the corresponding object as a control target.

In addition, according to the multi-angle object recognition system and method using V2X technology of the present disclosure, by coding the collected information, the data processing speed can be increased and the reliability of the processing results can be improved.

DETAILED DESCRIPTION

Hereinafter, a multi-angle object recognition system and method using V2X technology according to preferred embodiments of the present disclosure will be described in detail with reference to the accompanying drawings.

Figure 1:
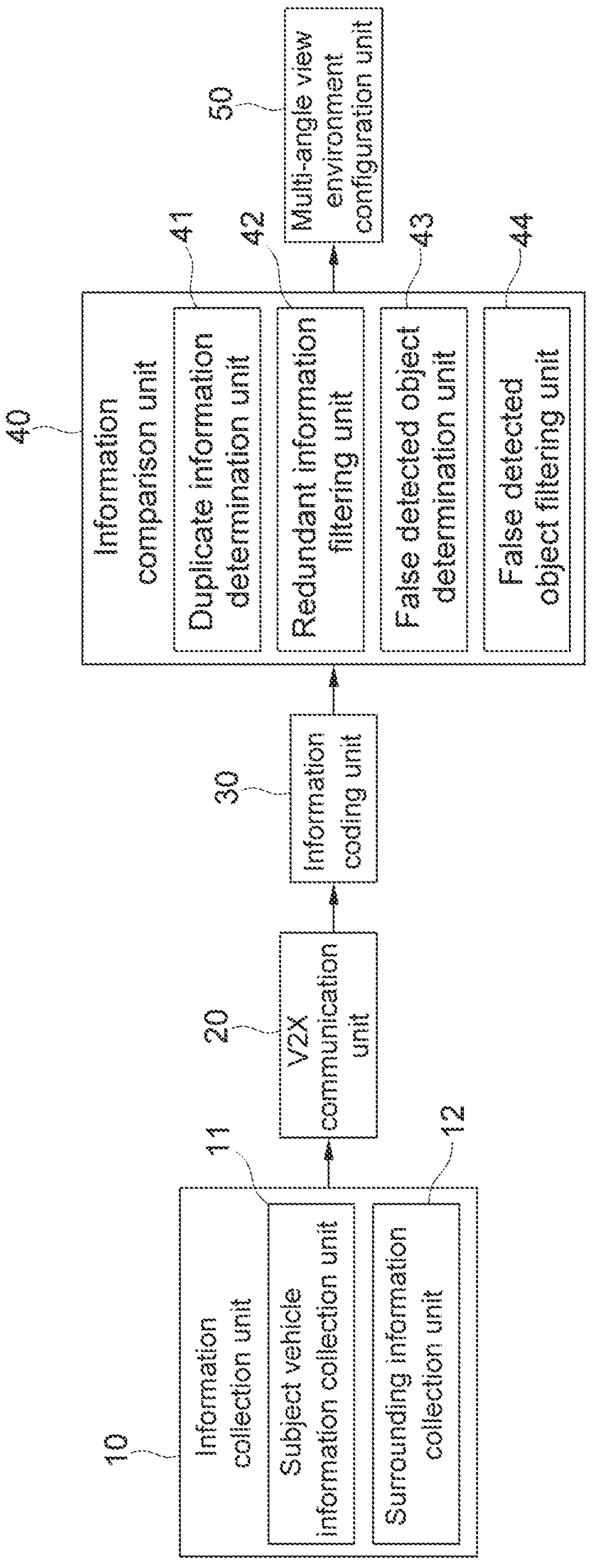
FIG. 1 is a configuration diagram of a multi-angle object recognition system using V2X technology according to a preferred embodiment of the present disclosure.
Figure 2:
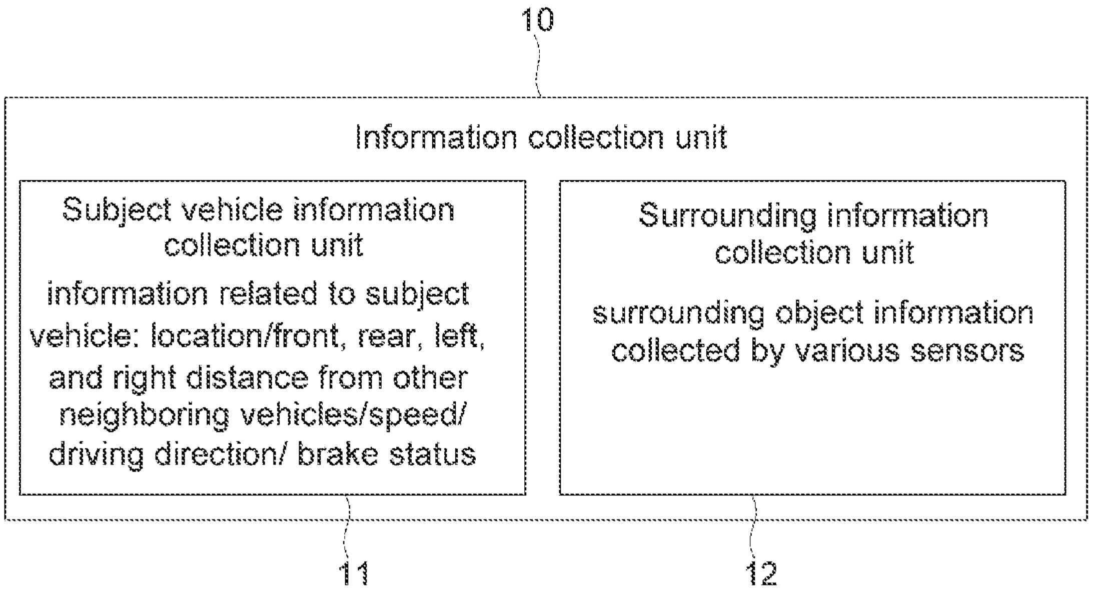
FIG. 2 is a configuration diagram specifying an information collection unit shown in FIG. 1.

FIG. 1 is a configuration diagram of a multi-angle object recognition system using V2X technology according to a preferred embodiment of the present disclosure, and FIG. 2 is a configuration diagram specifying an information collection unit shown in FIG. 1.

The multi-angle object recognition system using V2X technology according to the preferred embodiment of the present disclosure includes an information collection unit 10, a V2X communication unit 20, an information coding unit 30, an information comparison unit 40, and a multi-angle view environment configuration unit 50.

The information collection unit 10 collects information related to a subject vehicle and recognition information on objects around the subject vehicle, and may include a subject vehicle information collection unit 11 and a surrounding information collection unit 12. The subject vehicle information collection unit 11 collects information related to the subject vehicle, such as the location of the subject vehicle, the distance from other neighboring vehicles, the speed of the subject vehicle, the driving direction of the subject vehicle, and the brake status, by using GPS and various sensors, such as cameras, Radar, Lidar, etc., mounted on the subject vehicle. The subject vehicle information collection unit 11 may collect all of the above information or may select and collect at least one of them. The surrounding information collection unit 12 collects object recognition information around the subject vehicle using the sensors mounted on the subject vehicle.

The V2X communication unit 20 transmits information collected by the information collection unit 10 of each vehicle to other neighboring vehicles using V2X communication technology, and receives information collected by the other vehicles.

The information coding unit 30 codes information collected by the subject vehicle and information received from other vehicles. The same code is assigned to the same object. In the information coding unit 30, all information can be represented in a binary code using 0 and 1. The coding of information makes it easy to check whether the information collected by the subject vehicle matches (duplicates) the information received from other vehicles, and has the advantage of allowing data to be processed and transmitted at high speed by deleting redundant and unnecessary data. In particular, quickly determining the surrounding environment that changes while a vehicle is driving is directly related to the driving stability of the vehicle, so coding information for rapid data processing can be a great advantage.

The information comparison unit 40 compares information collected by the subject vehicle with information received from other vehicles to remove redundant information and falsely detected objects, and includes a duplicate information determination unit 41, a redundant information filtering unit 42, a false detected object determination unit 43, and a false detected object filtering unit 44.

The redundant information determination unit 41 compares the coded information collected by the subject vehicle with coded information collected from another vehicle to determine whether the collected information matches. When it is determined that the information collected by the subject vehicle matches the information received from another vehicle, the redundant information filtering unit 42 can reduce the amount of data to be processed by deleting the duplicate information received from another vehicle. When the duplicate information determination unit 41 determines that the information collected by the subject vehicle and the information received from another vehicle do not match, the false detected object determination unit 43 determines whether to include the corresponding information as the control target. When the false detected object determination unit 43 determines not to include the corresponding object information as the control target, the false detected object filtering unit 44 deletes the corresponding object information.

The multi-angle view environment configuration unit 50 configures the driving environment around the subject vehicle into a multi-angle view environment by combining only the normal information remaining after the redundant information and falsely detected objects are removed in the information comparison unit 40. The multi-angle view environment is updated in real time. An advanced driver assistance system and the like are automatically controlled according to the multi-angle view environment that is updated in real time, which improves vehicle driving stability. By implementing the multi-angle view environment on a monitor of the subject vehicle, the driver can visually check the surrounding conditions of the subject vehicle in real time.

Figure 3:
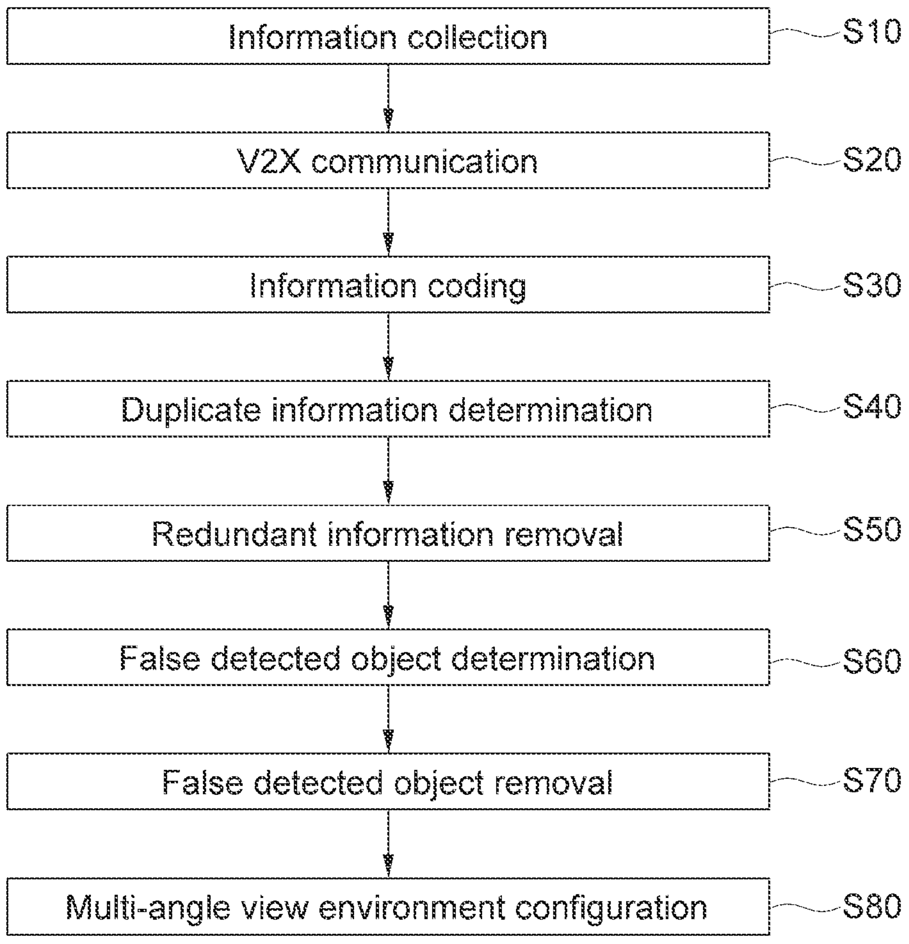
FIG. 3 is a process diagram showing the process of configuring a multi-angle view environment through a multi-angle object recognition method using V2X technology according to a preferred embodiment of the disclosure.
Figure 4:
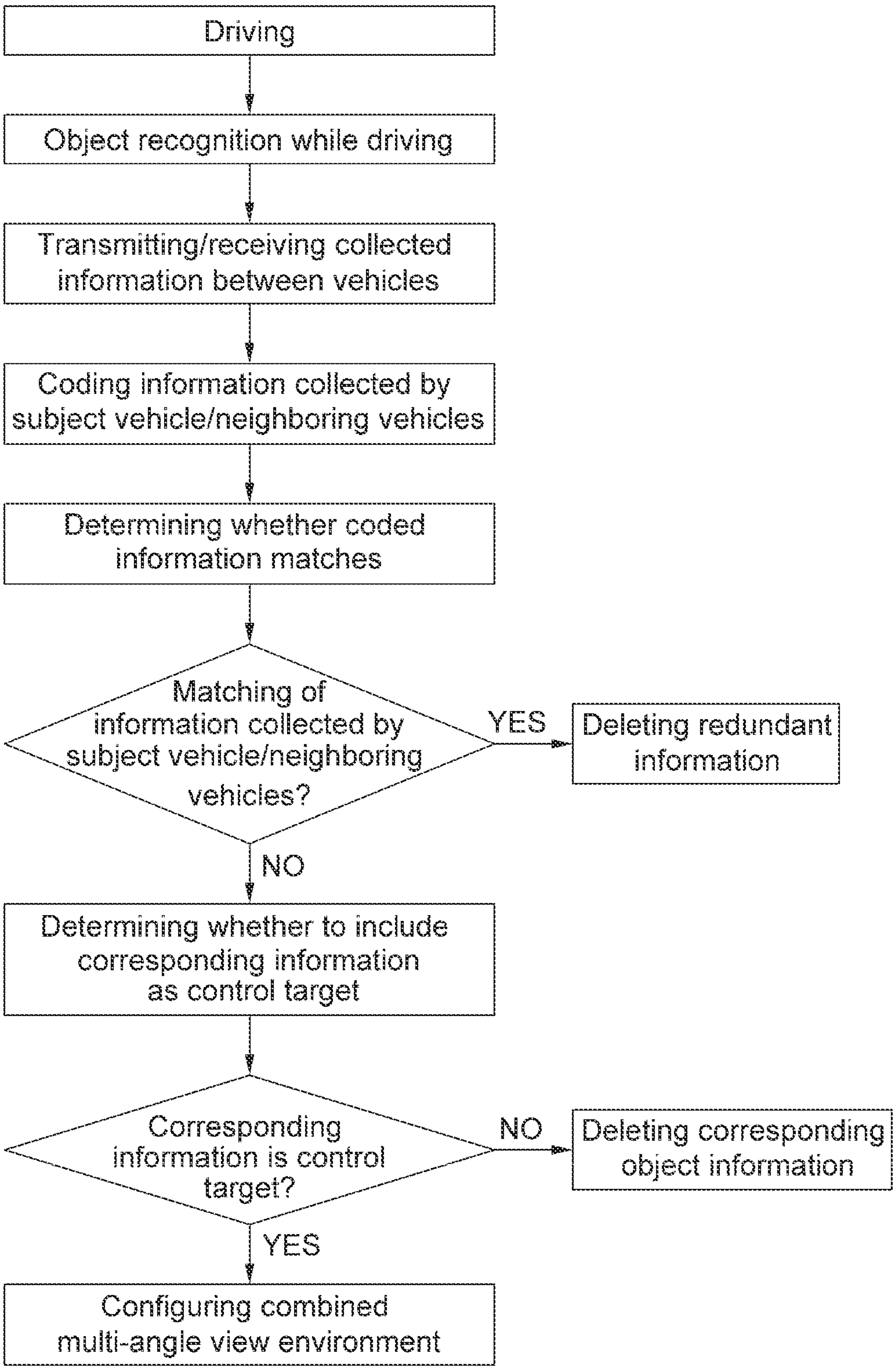
FIG. 4 is a flowchart showing the process of configuring the multi-angle view environment through the multi-angle object recognition method using V2X technology according to the preferred embodiment of the disclosure.

FIG. 3 is a process diagram showing the process of configuring the multi-angle view environment through a multi-angle object recognition method using V2X technology according to a preferred embodiment of the disclosure, and FIG. 4 is a flowchart showing the process of configuring the multi-angle view environment through the multi-angle object recognition method using V2X technology according to the preferred embodiment of the disclosure.

According to the multi-angle object recognition method using V2X technology according to the preferred embodiment of the present disclosure, it is possible to improve driving stability by recognizing objects around the subject vehicle from multiple angles using the multi-angle object recognition system shown in FIGS. 1 and 2. In other words, the multi-angle view environment can be configured by combining information collected by the subject vehicle and neighboring vehicles, and in the process, the amount of data to be processed can be reduced by deleting redundant information to increase processing speed, and by effectively removing objects subject to false detection, accurate view environment can be configured and updated in real time.

As shown in FIGS. 3 and 4, the multi-angle object recognition method using V2X technology according to the preferred embodiment of the present disclosure includes an information collection step S10, a V2X communication step S20, and an information coding step S30, a duplicate information determination step S40, a redundant information removal step S50, a false detected object determination step S60, a false detected object removal step S70, and a multi-angle view environment configuration step S80.

In the information collection step S10, all information related to a subject vehicle and information about surrounding objects are collected. The information related to the subject vehicle may be collected using sensors and GPS provided in the subject vehicle, and may include information such as the location of the subject vehicle, the distance to other neighboring vehicles, the speed of the subject vehicle, the driving direction of the subject vehicle, and the brake status of the subject vehicle. The information about surrounding objects may be collected using sensors provided in the subject vehicle, and the surrounding objects may include moving objects such as neighboring vehicles, and stationary objects such as traffic lights and guidance signs.

In the V2X communication step S20, information collected by respective neighboring vehicles is exchanged with each other through V2X communication. If there are no other vehicles nearby, the V2X communication step is omitted and the multi-angle view environment may be configured using only the information collected by the subject vehicle. In general, while the subject vehicle drives along a driving route, there will be sections where there are other vehicles around the subject vehicle, and sections where only the subject vehicle exists. Therefore, in the sections where other vehicles exist around the subject vehicle, the multi-angle view environment may be configured and updated including information collected by other vehicles, and in the sections where only the subject vehicle exists, only the information collected by the subject vehicle may be reflected in the configuration and update of the multi-angle view environment.

In the information coding step S30, all information collected by the subject vehicle and information received from other vehicles are coded. The coding may be performed using a binary code method using 0 and 1. By coding the collected information, it is easy to classify the collected information and determine whether the collected information is duplicated, and security can be enhanced. In addition, data processing speed can be increased by coding information, and when coded information is transmitted and received, transmission and reception speed can also be increased.

In the duplicate information determination step S40, the coded information collected by the subject vehicle is compared with the coded information received from another vehicle to determine whether they are identical, that is, whether they are duplicated. If the information code collected by the subject vehicle matches the information code received from another vehicle, it may be determined that the corresponding object information is a control target.

In the redundant information removal step S50, if it is determined in the duplicate information determination step S40 that the information code collected by the subject vehicle matches the information code received from another vehicle, only the corresponding object information collected by the subject vehicle is retained, and the corresponding duplicate object information received from another vehicle is removed. This process reduces the amount of data to be processed, and data processing speed can be increased.

When the coded information collected by the subject vehicle is compared with the coded information received from another vehicle and inconsistent information exists in the duplicate information determination step S40, in the false detected object determination step S60, it is determined whether to include the corresponding object of that information as a control target. In other words, the existence of an inconsistent information code between the information code received from another vehicle and the information code collected by the subject vehicle means that the object is detected by some vehicles but not by other vehicles, and it is necessary to determine whether to include it as the control target.

Let's assume a few cases where the information codes of the subject vehicle and another vehicle do not match.

First, there is a case where the object is detected by some vehicles and not by others because it is obscured by neighboring vehicles or other objects. For example, while driving, some vehicles cannot recognize a vehicle at an intersection because it is blocked by a vehicle turning right or left (Case 1).

Second, cases where a detection means such as a sensor temporarily malfunctions or breaks down, or the corresponding object is out of the detection range of the detection means may be considered. If an error occurs in the detection means, the corresponding object may be recognized as existing when it does not exist, or the corresponding object may be recognized as non-existent when it does exist (Case 2).

Third, there are no neighboring vehicles other than the subject vehicle (Case 3).

In this way, when some vehicles collect information about the corresponding object, while other vehicles do not collect information about the corresponding object, it is important to consider whether to include this object information as a control target, and based on the reliability of the information, information with a higher level of reliability may be considered first.

In the above Case 1, the information collected by the vehicle detecting the corresponding object may be judged to be highly reliable, and the corresponding object may be determined as a control target based on that information. In this regard, if there is an obstacle (vehicle or sign) between the corresponding object and a vehicle, the information collected by the corresponding vehicle may be given a low level of reliability, and if there is no obstacle between the corresponding object and a vehicle, the information collected by the corresponding vehicle may be given a high level of reliability. Even when there are no obstacles between the corresponding object and vehicles, reliability may be assigned in order of the distance between the corresponding object and the vehicles. In other words, the closer the distance between the corresponding object and the vehicle, the higher the reliability of the information collected by the corresponding vehicle. The object information collected by the vehicle closest to the object is given the highest reliability and can be considered and adopted prior to information collected by other vehicles.

In the above Case 2, the information collected by a vehicle without errors in the detection means for recognizing objects may be given a high level of reliability. For example, when an object is recognized in the subject vehicle's driving path while driving, but the corresponding object is not recognized in other vehicles, or vice versa, the reliability of the object information collected by other vehicles may be given higher than that of the information collected by the subject vehicle. In other words, if the number of vehicles that recognize the corresponding object is greater than the number of vehicles that do not recognize the corresponding object, and vice versa, the reliability of the object information on the side with the greater number of vehicles can be given higher reliability. The greater the difference in the number of vehicles, the higher the reliability may be assigned.

In addition, each vehicle may be equipped with a plurality of detection means, and different reliability may be given depending on whether the detection information of the corresponding object through the detection means provided in each vehicle is consistent. For example, the corresponding object information of a vehicle that recognizes the corresponding object through all or none of the detection means provided therein may be assigned a higher level of reliability than the corresponding object information of a vehicle that does not (the recognition is different between the detection means provided in the same vehicle).

As in the above Case 3, when there are no vehicles other than the subject vehicle nearby, the object recognition information detected by the subject vehicle can be given a high level of reliability. However, since an error may occur in the subject vehicle's detection means, if the corresponding object is recognized through the detection means, the possibility of collision with the corresponding object can be prevented in advance by determining the corresponding object as a control target regardless of the error in the detection means. For example, assuming that sensors are installed on the left and right sides of the vehicle to recognize objects while driving, if the left sensor recognizes an object but the right sensor does not recognize the corresponding object, the corresponding object may be determined to exist on the driving path and may be determined as a control target.

In the false detected object removal step S70, when it is determined in the false detected object determination step S60 that the recognized object does not correspond to the control target, the corresponding object information is removed.

In the multi-angle view environment configuration step S80, a multi-angle view environment is configured by combining all the normal object collection information of the subject vehicle and other vehicles determined as the control target through the above-described process, so that the advanced driver assistance system and the like are automatically controlled depending on the multi-angle view environment, thereby greatly improving the driving stability of the vehicle.

The steps S10 to S70 are repeatedly performed while the vehicle is driving, and the multi-angle view environment may be updated in real time.

Figure 5:
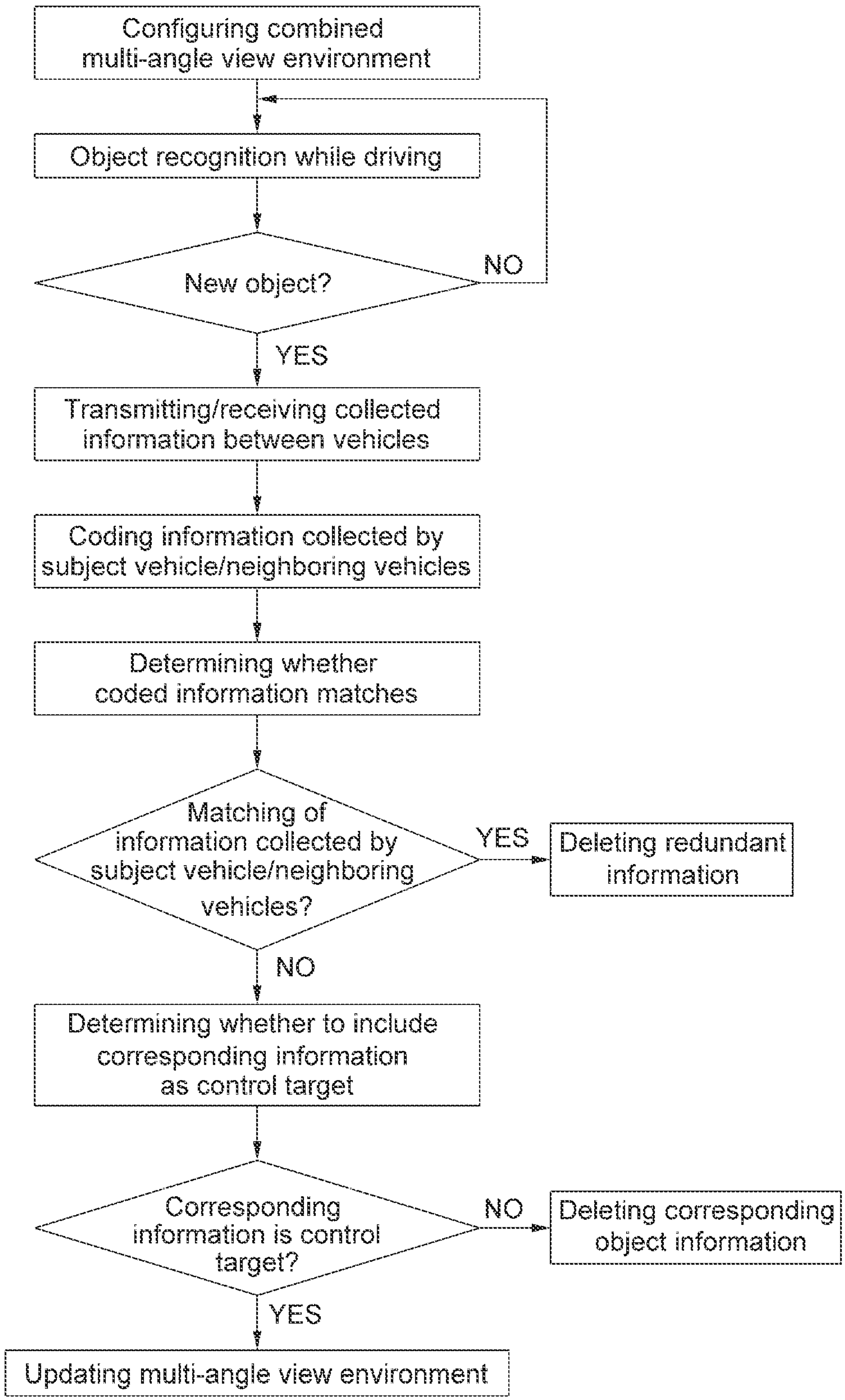
FIG. 5 is a flowchart showing the process of updating the multi-angle view environment through the multi-angle object recognition method using V2X technology according to the preferred embodiment of the disclosure.

FIG. 5 is a flowchart showing the process of updating the multi-angle view environment through the multi-angle object recognition method using V2X technology according to the preferred embodiment of the present disclosure.

Even when the multi-angle view environment is configured through the steps S10 to S70, the multi-angle view environment needs to be updated in real time because the subject vehicle and surrounding environment may change in real time while the vehicle is driving.

As shown in FIG. 5, each vehicle recognizes objects while driving in the multi-angle view environment, and for previously recognized objects, the corresponding object information is removed because it is already reflected information when configuring the multi-angle view environment. If the already reflected object information is transmitted and received between vehicles and included as the control target, the amount of data to be processed increases, which may slow down the data processing speed and interfere with the real-time update of the multi-angle view environment, so it is desirable to remove it prior to the V2X communication stage.

If the object is a newly recognized object, the multi-angle view environment may be updated in real time through the process of transmitting and receiving information between vehicles, coding the collected information, comparing the collected information, deleting redundant information, and removing objects that do not need to be controlled.

Except for the processes of recognizing and determining new objects while driving, the rest processes are the same as those in FIG. 4, so detailed descriptions thereof will be omitted.

Although the multi-angle object recognition system and recognition method using V2X technology according to the preferred embodiment of the present disclosure have been described in detail with reference to the attached drawings as described above, the present disclosure is not limited to the above-described embodiment and may be implemented in various modifications within the scope of the following claims.

What is claimed is:

1. A multi-angle object recognition system using V2X technology, the system comprising:

an information collection unit configured to collect information about a subject vehicle and surrounding information;

a V2X communication unit configured to transmit and receive information collected by the information collection unit between vehicles;

an information comparison unit configured to compare information collected by the subject vehicle with information received from another vehicle, to determine whether the information collected by the subject vehicle matches the information received from the another vehicle, and when the information collected by the subject vehicle matches the information received from the another vehicle, to delete redundant information received from the another vehicle, and when a false detection occurs, to exclude the false detection from a control target; and a multi-angle view environment configuration unit configured to configure driving environment around the subject vehicle into a multi-angle view environment by combining only normal information among the information collected by the subject vehicle and the information received from the another vehicle.

2. The system of claim 1, wherein the information collection unit includes:

a subject vehicle information collection unit configured to collect information related to the subject vehicle; and a surrounding information collection unit configured to collect information about an object around the subject vehicle.

3. The system of claim 2, wherein the information collected by the subject vehicle information collection unit includes at least one of a location of the subject vehicle, a distance to another vehicle, a speed of the subject vehicle, a driving direction of the subject vehicle, and a brake status of the subject vehicle.

4. The system of claim 2, wherein the subject vehicle information collection unit and the surrounding information collection unit include sensors mounted to the vehicles.

5. The system of claim 1, further comprising an information coding unit configured to code the information collected by the subject vehicle and the information received from the another vehicle.

6. The system of claim 5, wherein the information comparison unit is configured to compare the coded information collected by the subject vehicle with the coded information received from the another vehicle.

7. The system of claim 6, wherein the information comparison unit includes:

a duplicate information determination unit configured to determine whether the information collected by the subject vehicle matches the information received from the another vehicle; and a redundant information filtering unit configured to delete, when the information collected by the subject vehicle matches the information received from the another vehicle, the redundant information received from the another vehicle.

8. The system of claim 7, wherein the information comparison unit includes:

a false detected object determination unit configured to determine, when there is a discrepancy between the information collected by the subject vehicle and the information received from the another vehicle, whether to include the discrepant information as the control target; and a false detected object filtering unit configured to delete, when the false detected object determination unit determines not to include corresponding object information as the control target, the corresponding object information.

9. A multi-angle object recognition method using V2X technology, the method comprising:

collecting information about a subject vehicle and surrounding information;

transmitting and receiving the collected information between vehicles through a V2X communication unit;

comparing information collected by the subject vehicle with information received from another vehicle, determining whether the information collected by the subject vehicle matches the information received from the another vehicle, and when the information collected by the subject vehicle matches the information received from the another vehicle, deleting redundant information received from the another vehicle;

excluding false detected object from a control target; and configuring a multi-angle view environment by combining normal information among the information collected by the subject vehicle and the information received from the another vehicle.

10. The method of claim 9, wherein the comparing of the information includes coding the information collected by the subject vehicle and the information received from the another vehicle, and comparing the coded information.

11. The method of claim 10, wherein the coding is performed in a binary code method using 0 and 1.

12. The method of claim 10, wherein when it is determined that the information collected by the subject vehicle matches the information received from the another vehicle through the comparing of the coded information, the redundant information received from the another vehicle is deleted.

13. The method of claim 12, wherein when it is determined that there is a discrepancy between the information collected by the subject vehicle and the information received from the another vehicle through the comparing of the information, whether to include discrepant corresponding object information as the control target is determined.

14. The method of claim 13, wherein when it is determined that the corresponding object information is not the control target, the corresponding object information is removed.

15. The method of claim 14, wherein the multi-angle view environment is configured by combining all normal object information collected by the subject vehicle and the another vehicle that is determined as the control target.

16. The method of claim 14, wherein based on reliability of information collected by the subject vehicle and the another vehicle for the corresponding object, information with a high level of reliability is first considered.

17. The method of claim 16, wherein when there is an obstacle between the corresponding object and a vehicle, the information collected by the corresponding vehicle is given a low level of reliability, and when there is no obstacle between the corresponding object and a vehicle, the information collected by the corresponding vehicle is given a high level of reliability.

18. The method of claim 17, wherein when there is no obstacle between the corresponding object and a vehicle, the closer a distance between the corresponding object and the corresponding vehicle, the higher the reliability of the information collected by the corresponding vehicle.

19. The method of claim 16, wherein the information collected by a vehicle without errors in detection means that recognize objects is given a high level of reliability.

20. The method of claim 9, wherein after configuring the multi-angle view environment, the multi-angle view environment is updated by reflecting newly recognized normal object information.

* * * * *